(12) United States Patent
Chen et al.

(10) Patent No.: US 9,776,310 B2
(45) Date of Patent: Oct. 3, 2017

(54) DRIVING HEAD-CHANGEABLE TOOL AND SLEEVE ASSEMBLY THEREOF

(71) Applicant: YUAN LI HSING INDUSTRIAL CO., LTD., Taichung (TW)

(72) Inventors: Chia-Yi Chen, Taichung (TW); Hui-Chien Chen, Taichung (TW)

(73) Assignee: Yuan Li Hsing Industrial Co., Ltd., Taichung (TW)

( * ) Notice: Subject to any disclaimer, the term of this patent is extended or adjusted under 35 U.S.C. 154(b) by 422 days.

(21) Appl. No.: 14/465,762

(22) Filed: Aug. 21, 2014

(65) Prior Publication Data

US 2016/0052111 A1 Feb. 25, 2016

(51) Int. Cl.
*B25B 23/00* (2006.01)
*F16D 3/06* (2006.01)
*F16D 3/18* (2006.01)
*F16D 1/10* (2006.01)

(52) U.S. Cl.
CPC ...... *B25B 23/0035* (2013.01); *B25B 23/0028* (2013.01); *F16D 3/06* (2013.01); *F16D 3/185* (2013.01); *F16D 2001/102* (2013.01)

(58) Field of Classification Search
CPC ............ B25B 23/0035; B25B 23/0028; B25B 23/0014; F16D 3/185; F16D 3/06; F16D 3/221; F16D 3/20; F16D 2001/102; Y10T 403/32041; Y10T 403/7098; Y10T 403/32631; Y10T 403/32647
USPC ................................ 81/177.75; 464/901, 106
See application file for complete search history.

(56) References Cited

U.S. PATENT DOCUMENTS

| | | | | |
|---|---|---|---|---|
| 3,107,504 A * | 10/1963 | Koss | .................. | F16D 3/221 464/141 |
| 3,107,505 A * | 10/1963 | Koss | .................. | F16D 3/221 464/141 |
| 8,246,476 B2 * | 8/2012 | Chen | .................. | B25B 13/481 464/141 |
| 9,205,543 B1 * | 12/2015 | Chen | .................. | B25B 23/0035 |
| 2011/0179915 A1 * | 7/2011 | Peng | .................. | B25B 13/06 81/177.75 |
| 2011/0256938 A1 * | 10/2011 | Chen | .................. | B25B 13/481 464/141 |
| 2015/0298302 A1 * | 10/2015 | Chen | .................. | B25B 23/0014 464/153 |
| 2015/0375377 A1 * | 12/2015 | Chen | .................. | B25B 23/0035 81/124.6 |

(Continued)

*Primary Examiner* — Matthieu F Setliff
(74) *Attorney, Agent, or Firm* — Muncy, Geissler, Olds & Lowe, P.C.

(57) ABSTRACT

A driving tool is provided, including a tool set and a driving head. The tool set includes a connecting sleeve, an outer sleeve and at least one limitation member. The connecting sleeve has a receiving slot and a driving end. A plurality of protruding ribs extending axially and a plurality of recesses disposed between the protruding ribs are disposed on an inner wall of the receiving slot. The recesses are provided for a polygonal ball head to insert therein. A recessed portion and a protruding portion are disposed on the inner wall. The outer sleeve is slidable between a first position and a second position. When the outer sleeve is at the first position, the limitation member can restrict the polygonal ball head. When the outer sleeve is at the second position, the polygonal ball head is withdrawable from the receiving slot.

12 Claims, 9 Drawing Sheets

(56) References Cited

U.S. PATENT DOCUMENTS

2016/0138657 A1\* 5/2016 Chen ................... F16D 3/185
                                                                                                464/158

\* cited by examiner

DRIVING HEAD-CHANGEABLE TOOL AND SLEEVE ASSEMBLY THEREOF

BACKGROUND OF THE INVENTION

Field of the Invention

The present invention relates to a driving head-changeable tool, and more particularly to a driving head-changeable tool and sleeve assembly thereof.

Description of the Prior Art

In prior arts of connecting head in two-part form, a polygonal ball head of a support rod is received in a receiving slot of a working head. And a shape of the receiving slot corresponds to the polygonal ball head and is formed with a polygonal shape. The support rod is fixedly connected with the working head through a connecting structure when the support rod is pushed in, and the support rod is swingable relative to the working head when the support rod is pulled out. The prior art as described above is disclosed in TW566284 and TWM357344.

A structure as disclosed in TW566284 has an inner wall of the receiving slot which is formed with a polygonal shape, and the inner wall contacts with the polygonal ball head through surfaces. When using an electrical driver to drive the support rod to rotate relative to the working head with a high speed, the polygonal ball head and the receiving slot are easily got stuck with each other due to large friction, and it damages the electrical driver and the connecting head in two-part form. Moreover, the friction wastes extra energy during operating and reduces a working efficiency, and it is bad for operators to operate.

A structure as described in TWM357344 is formed with a plurality of flanges on a side wall of the receiving slot. The flanges are equidistantly and axially disposed on the side wall of the receiving slot. A number of the flanges corresponds to a number of corners of the polygonal ball head. And each of the flanges is formed with a contacting surface of a convex camber for contacting with the polygonal ball head. The support rod and the working head are linking-up in rotating, and it improves a problem of TW566284.

However, either TW566284 or TWM357344 is unformed with flanges to effectively stop corner portions of the polygonal ball head. The driving head easily slides out when it rotates with a high speed, and it brings about security problems, stops a work and reduces work efficiency.

Although a connecting head tool in two-part form with a polygonal ball head normally inserted in a receiving slot is provided, however, when a driving head is needed to be replaced for driving different types of driving members, the driving head is unchangeable so that an additional new set of tool is needed. It costs a lot in buying tools and takes lots of time in working. These disadvantages are needed to be improved.

The present invention has arisen to mitigate and/or obviate the afore-described disadvantages.

SUMMARY OF THE INVENTION

The primary object of the present invention is to provide a driving head-changeable tool and sleeve assembly thereof which is rapid for changing the driving head and has a simple structure so that it is easy for manufacturing and assembling. And it also helps to improve a working efficiency and is convenient in operating for operators because a friction is reduced substantially. It also solves a problem of prior art that a structure of prior art gets stuck when rotating with a high speed.

To achieve the above object, a driving head-changeable tool sleeve assembly is provided, including a tool set and a driving head. The tool set includes a connecting sleeve, an outer sleeve and at least one limitation member. The connecting sleeve has a receiving slot and a driving end corresponding to each other. A plurality of protruding ribs extending axially and a plurality of recesses disposed between the protruding ribs are disposed on an inner wall of the receiving slot. The recesses of the receiving slot are provided for a polygonal ball head of a driving head to insert therein. The outer sleeve is axially slidably telescoped around the connecting sleeve, and the outer sleeve and the connecting sleeve are mutually restricted. A recessed portion and a protruding portion are disposed on the inner wall. The outer sleeve is slidable between a first position and a second position relative to the connecting sleeve. The limitation member is formed with one the protruding rib and controllably protruded out of the receiving slot. When the outer sleeve is at the first position, the protruding portion abuts against the limitation member to protrude to within the receiving slot, and the limitation member blocks and restricts the polygonal ball head in the receiving slot. When the outer sleeve is at the second position, the recessed portion corresponds to the limitation member and the driving head so that the limitation member is allowed to move to within the recessed portion, and the polygonal ball head is withdrawable from the receiving slot.

To achieve the above object, a driving head-changeable tool is also provided, including a driving head-changeable tool sleeve assembly as described above, further including a driving head. The driving head is formed with a polygonal ball head and a radial flange correspondingly above the polygonal ball head, and the driving head is detachably inserted in the receiving slot of the connecting sleeve.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-6, a driving head-changeable tool sleeve assembly 1 in accordance with a preferred embodiment of the present invention includes a connecting sleeve 10, an outer sleeve 20 and at least one limitation member 30.

Figure 1:
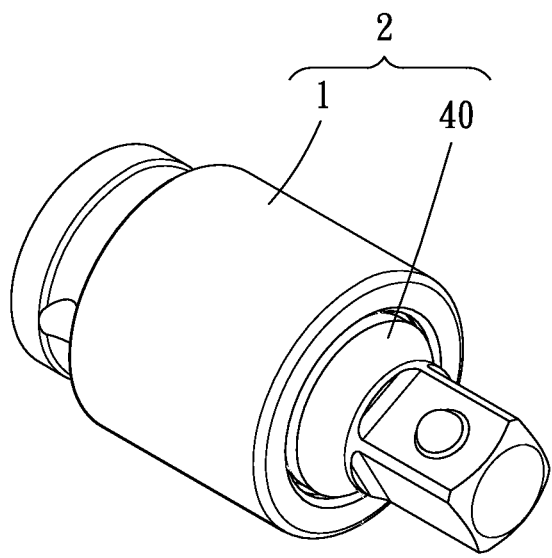
FIG. 1 is a perspective drawing of a first preferred embodiment of the present invention.
Figure 2:
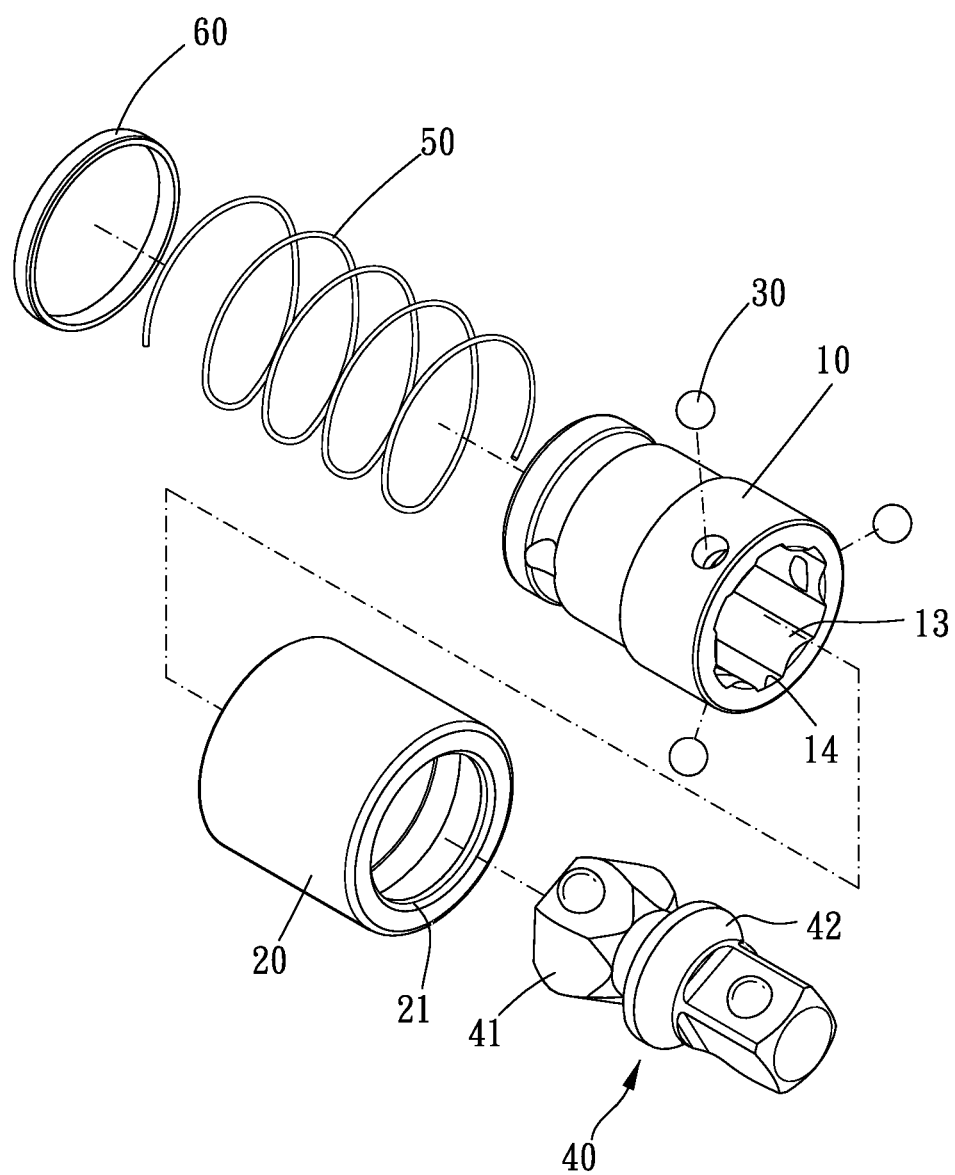
FIG. 2 is a breakdown drawing of the first preferred embodiment of the present invention.
Figure 3:
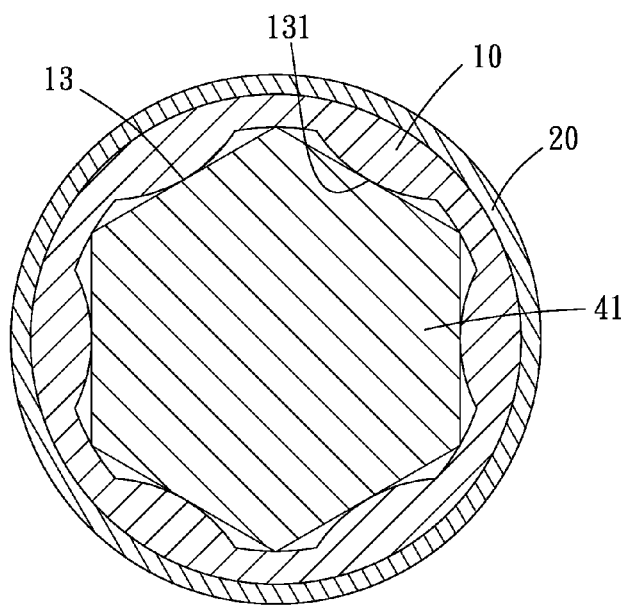
FIGS. 3-5 are cross-sectional drawings of the first preferred embodiment of the present invention.
Figure 4:
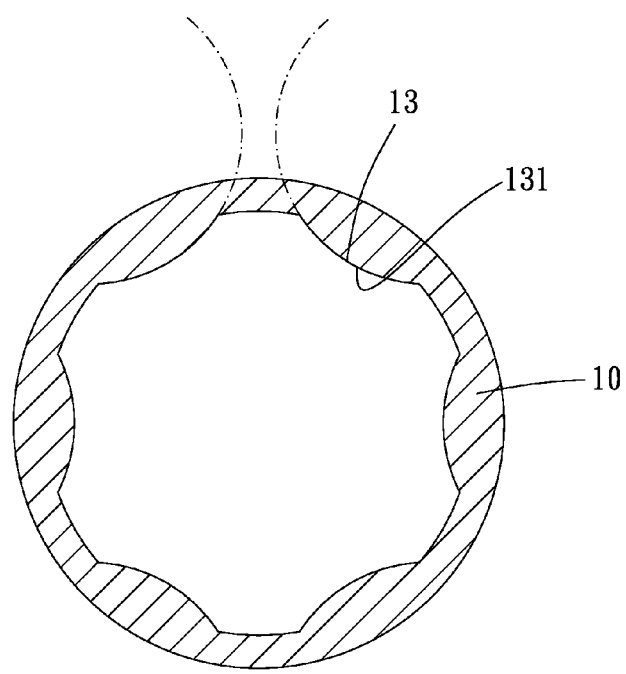
Figure 5:
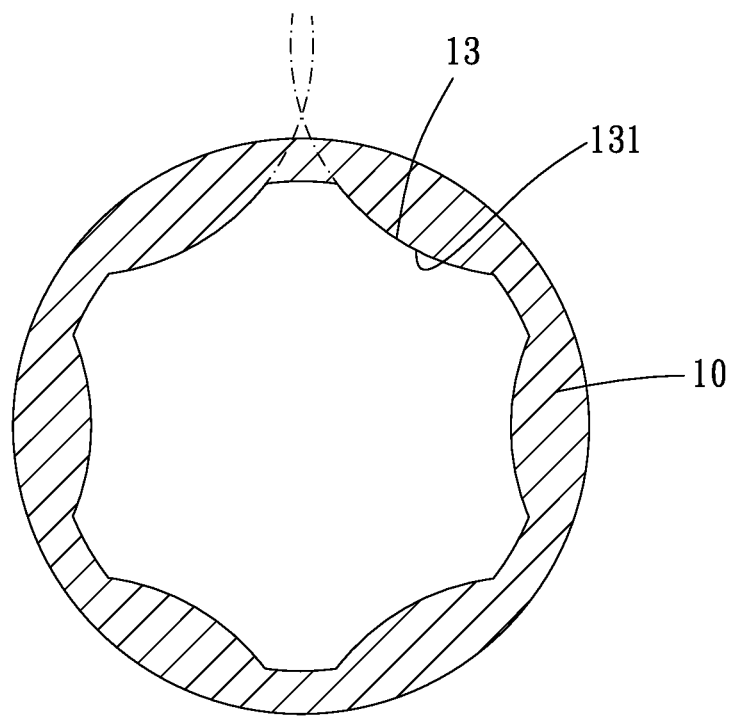

The connecting sleeve 10 includes a receiving slot 11 and a driving end 12 corresponding to each other. An inner wall of the receiving slot 11 is formed with a plurality of protruding ribs 13 extending axially and a plurality of recesses 14 disposed between the protruding ribs 13. In a radial cross-section, each of the protruding ribs 13 is formed with a protruding camber 131 connected with two of the recesses 14. In other words, two ends of each of the recesses 14 are straightly or recurvedly connected with the adjacent two protruding cambers 131. Moreover, extensions of the adjacent two protruding cambers 131 disintersected on the connecting sleeve (as shown in FIGS. 4-5) so that each of the protruding ribs 13 includes an arc surface with larger radius of curvature, and it reduces a friction in contacting and helps a relative motion. The recesses 14 of the receiving slot 11 are provided for a polygonal ball head 41 of a driving head 40 to insert therein. The driving head 40 further includes a radial flange 42 correspondingly above the polygonal ball head 41. Wherein each of the protruding ribs 13 has an arc surface with larger radius of curvature and it helps the polygonal ball head 41 of the driving head 40 to rotate in the receiving slot 11. Preferably, the connecting sleeve 10 is formed with a first circumferential chamfer 15 along a rim of an opening of the receiving slot 11. The first circumferential chamfer 15 can be an inclined surface or an arc surface. The first circumferential chamfer 15 helps the driving head 40 to rotate and swing with an angle. In the present embodiment, the driving end 12 is formed with a polygonal-shaped connecting hole for connecting with a connecting head (such as a connecting head of a rotating tool). However, the driving end 12 can be formed with a polygonal-shaped connecting rod for connecting with a connecting hole (such as a connecting hole of a rotating tool).

The outer sleeve 20 is axially slidably telescoped around the connecting sleeve 10, and the outer sleeve 20 and the connecting sleeve 10 are mutually restricted. The outer sleeve 20 is slidable between a first position and a second position relative to the connecting sleeve 10. An end of the outer sleeve 20 radially extends to form a positioning flange 21, and a recessed portion 22 and a protruding portion 23 protruded relative to the recessed portion 22 are disposed on an inner wall of the outer sleeve 20. In a radial direction, a sleeve opening defined by the positioning flange 21 is greater than or equal to an opening of the receiving slot 11. In the present embodiment, a stepped portion is formed between the positioning flange 21 and the receiving slot 11 so that the driving head 40 rotates and swings without any disturbance. Preferably, the outer sleeve 20 is formed with a second circumferential chamfer 24 along a rim of the sleeve opening of the positioning flange 21. The first and second circumferential chamfers 15, 24 are disposed in an inside-and-outside arrangement, and a stepped portion is formed between the first and second circumferential chamfers 15, 24. It helps the driving head 40 to rotate and swing with an angle.

In the present embodiment, an elastic member 50 is abutted against between the connecting sleeve 10 and the outer sleeve 20. The elastic member 50 is such as a circular spring and disposed between the connecting sleeve 10 and the outer sleeve 20. Two ends of the elastic member 50 are respectively abutted against the connecting sleeve 10 and the outer sleeve 20 so that the connecting sleeve 10 and the outer sleeve 20 tend to move away from each other. Specifically, an inner wall of an end of the outer sleeve 20 is connected with a limiting collar 60 tightly. The connecting sleeve 10 is radially extended to be a shoulder portion 16. The elastic member 50 is abutted against between the limiting collar 60 and the shoulder portion 16. The limiting collar 60 is untouched with the connecting sleeve 10 so that the connecting sleeve 10 and the outer sleeve 20 are slidable relative to each other limitedly.

In the present embodiment, a number of the limitation members 30 is three, but the number can also be one, two or more than three. Preferably, the limitation members 30 are equiangularly arranged, and each of the limitation members 30 is disposed on one of the protruding ribs 13 and between the connecting sleeve 10 and the outer sleeve 20. The limitation member 30 is selectively protruded in the receiving slot 11. Specifically, the limitation member 30 is a ball body. The limitation member 30 is received in a through hole of the connecting sleeve 10 and movable in the through hole. However, the limitation member 30 can be other non-ball body structures, only if the limitation member 30 is provided with a limiting function.

Figure 6:
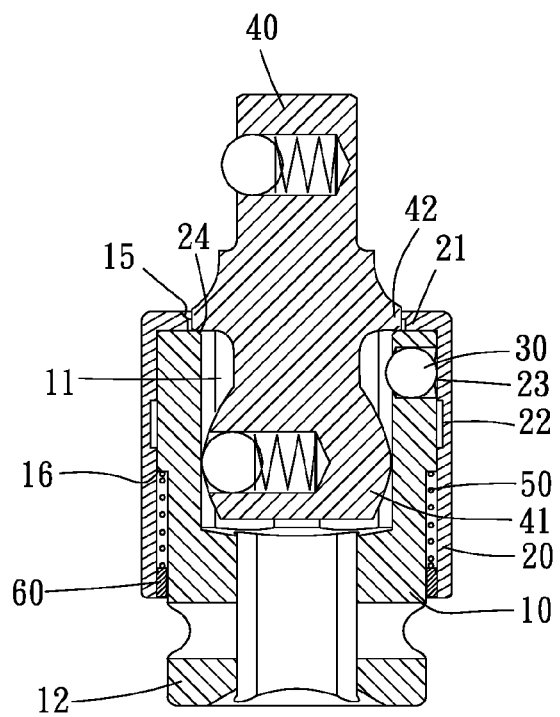
FIGS. 6-9 are perspective drawings of the first preferred embodiment of the present invention in use.
Figure 7:
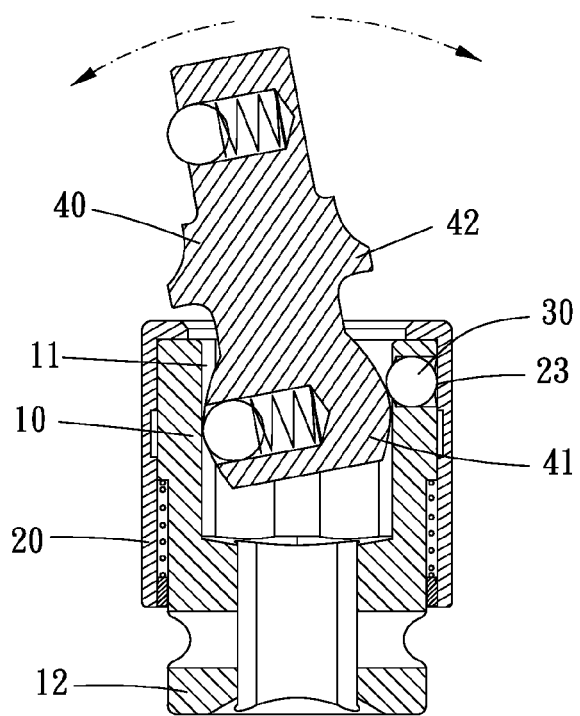
Figure 8:
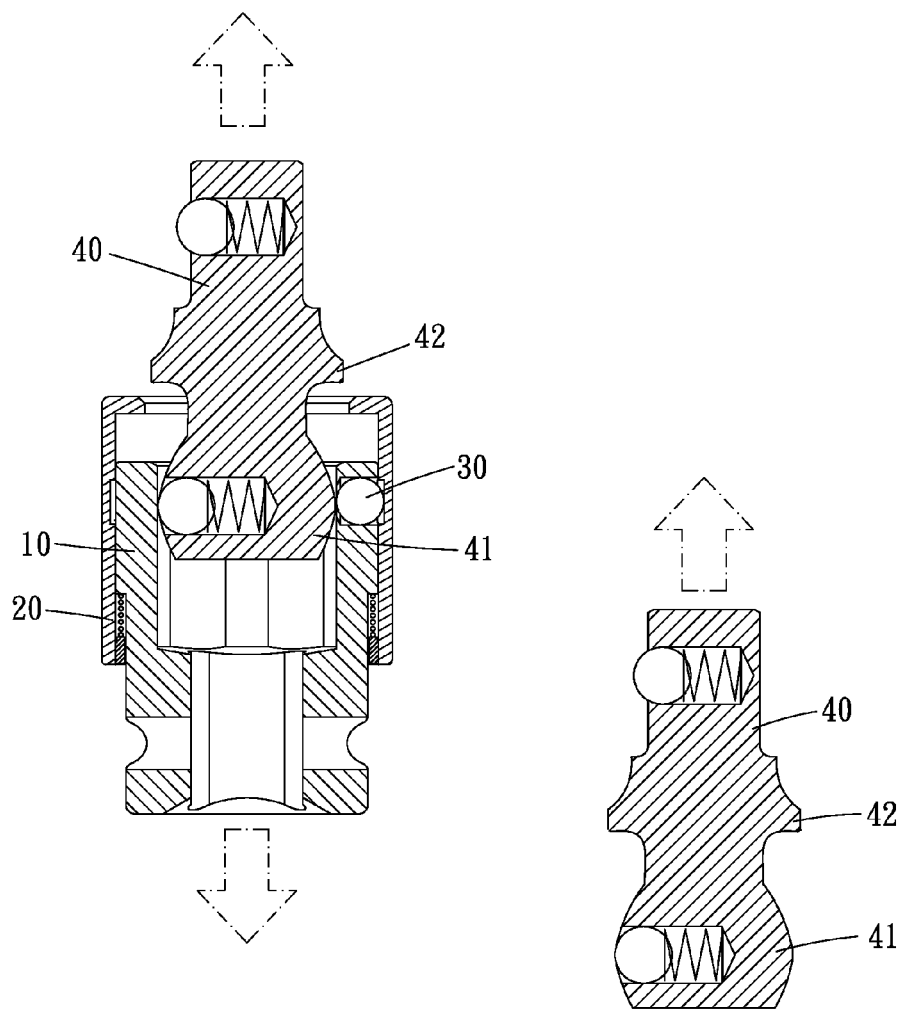
Figure 9:
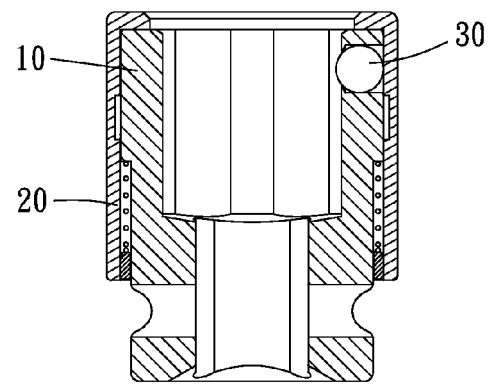

Please referring to FIGS. 7-9, when the outer sleeve 20 is at the first position (as shown in FIGS. 6 and 7), the protruding portion 23 abuts against the limitation member 30 to protrude to within the receiving slot 11, and the limitation member 30 blocks and restricts the polygonal ball head 41 in the receiving slot 11 (because a radial distance between the protruding portion 23 and an inner wall of the connecting sleeve 10 is smaller than a maximum radial dimension of the polygonal ball head 41). The driving head 40 is unreleased from the receiving slot 11. When the outer sleeve 20 is at the first position and the radial flange 42 is limited in the sleeve opening by the positioning flange 21 (as shown in FIG. 6), the driving head 40 and the connecting sleeve 10 are unrotatable relative to each other. The driving head 40 is limited to swing relative to the connecting sleeve 10. When the outer sleeve 20 is at the first position and the radial flange 42 is located outside the sleeve opening (as shown in FIG. 7), the driving head 40 is swingable about the polygonal ball head 41 relative to the connecting sleeve 10. When the outer sleeve 20 is at the second position (as shown in FIG. 8), the recessed portion 22 corresponds to the limitation member 30 so that the limitation member 30 is allowed to move to within the recessed portion 22, and the polygonal ball head 41 is withdrawable from or insertable in the receiving slot 11 (because a radial distance between the protruding portion 23 and an inner wall of the connecting sleeve 10 is greater than a maximum radial dimension of the polygonal ball head 41). When the polygonal ball head 41 is removed from the receiving slot 11, the elastic member 50 pushes the connecting sleeve 10 and the outer sleeve 20 back to the first position (as shown in FIG. 9).

Figure 10:
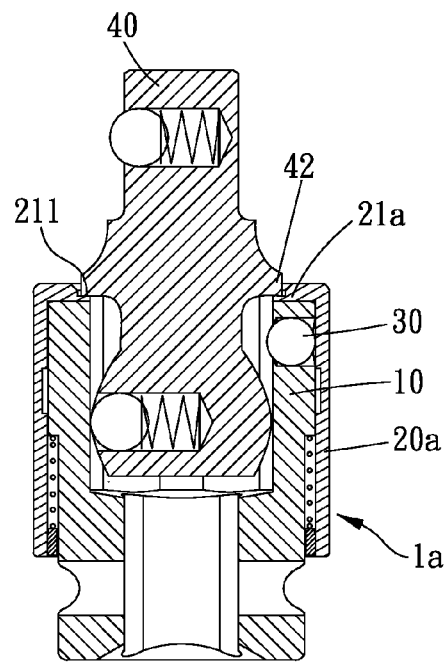
FIGS. 10-11 are perspective drawings of a second embodiment of the present invention.
Figure 11:
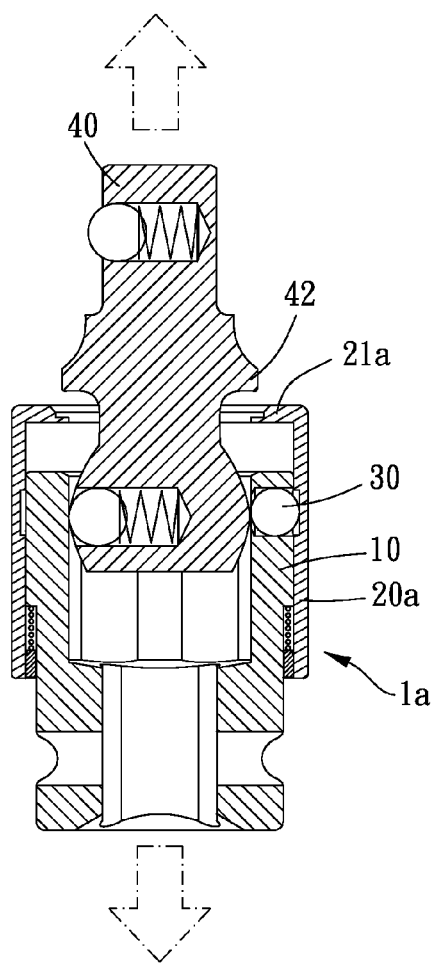

Referring to FIGS. 10 and 11, in a second embodiment, a driving head-changeable tool sleeve assembly 1a includes an outer sleeve 20a, and the outer sleeve 20a has a positioning flange 21a. As viewed along an axial direction, at least a part of the positioning flange 21a overlaps between a radial flange 42 of a driving head 40 and a connecting sleeve 10. Practically, a top surface of the positioning flange 21a is concavely formed with a first stepped portion 211, and the first stepped portion 211 is disposed along a rim of the sleeve opening of the positioning flange 21a. When the outer sleeve 20a moves toward the second position, the driving head 40 is withdrawable and for replacing with others.

Figure 12:
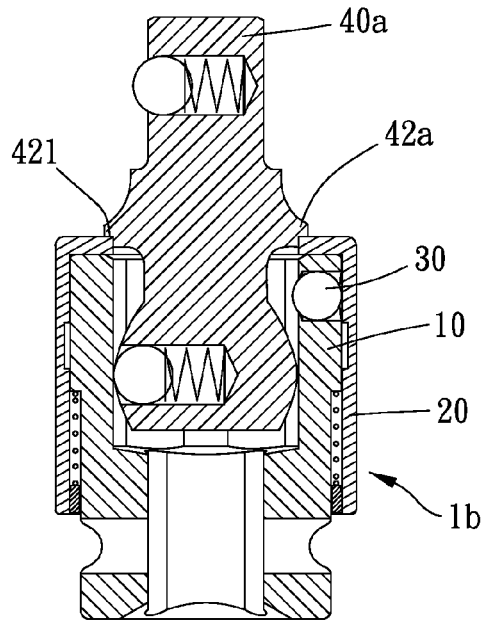
FIGS. 12-13 are perspective drawings of a third embodiment of the present invention.
Figure 13:
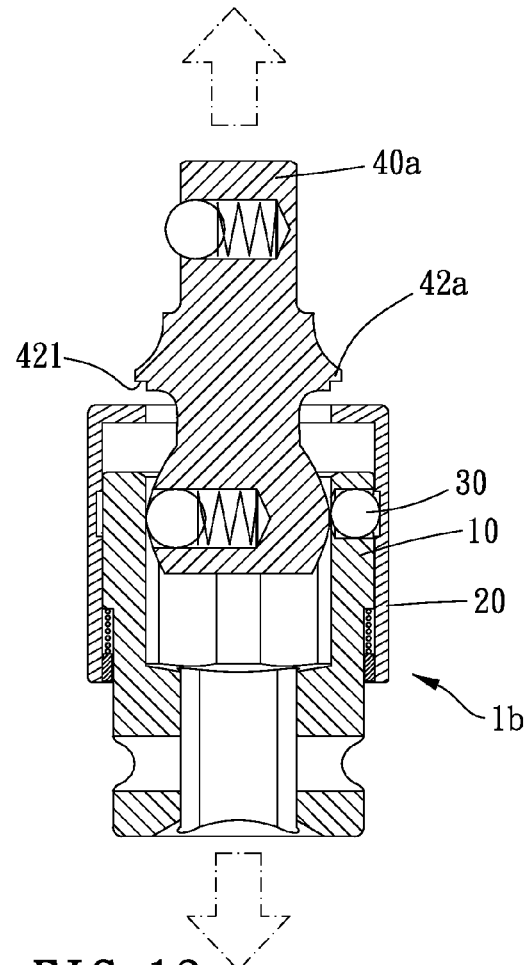

Referring to FIGS. 12 and 13, in a third embodiment, it is noted that a bottom surface of a radial flange 42a of a driving head 40a of a driving head-changeable tool sleeve assembly 1b is concavely formed with a second stepped portion 421. As viewed along an axial direction, at least a part of the second stepped portion 421 overlaps a positioning flange 21 of an outer sleeve 20; when the outer sleeve 20 moves toward the second position, the driving head 40a is also withdrawable and for replacing with others.

Figure 14:
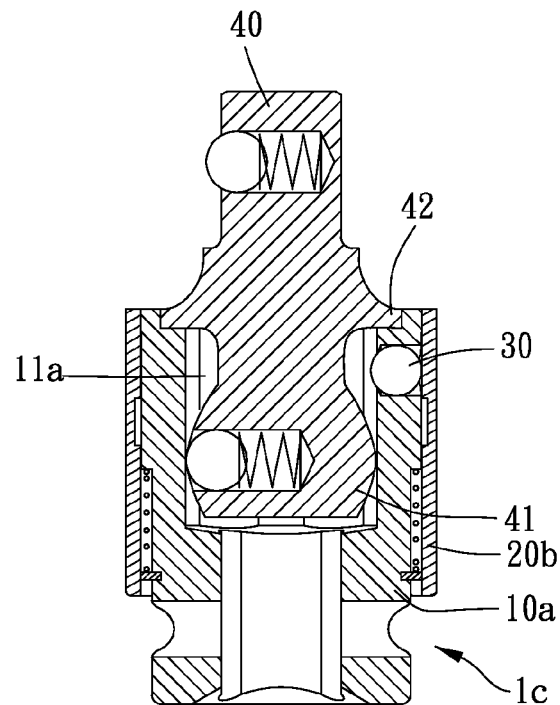
FIGS. 14-15 are perspective drawings of a forth embodiment of the present invention.
Figure 15:
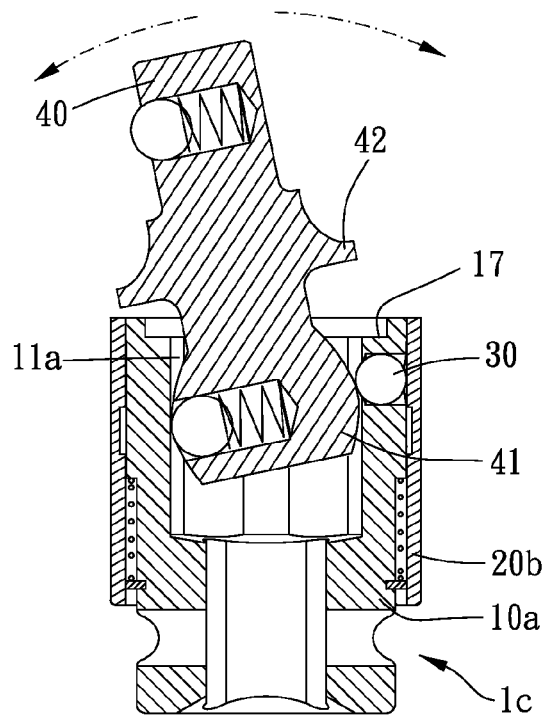

Referring to FIGS. 14 and 5, in a forth embodiment, a top surface of the connecting sleeve 10a of a driving head-changeable tool sleeve assembly 1c is concavely formed with a third stepped portion 17. The third stepped portion 17 is disposed along an inner rim of an opening of a receiving slot 11a of the connecting sleeve 10a. When an outer sleeve 20b is at the first position and a radial flange 42 of a driving head 40 is limited in the third stepped portion 17 (as shown in FIG. 14), the driving head 40 and the connecting sleeve 10a are unrotatable relative to each other; when the outer sleeve 20b is at the first position and the radial flange 42 is located outside the third stepped portion 17 (as shown in FIG. 15), the driving head 40 is swingable about the polygonal ball head 41 relative to the connecting sleeve 10a.

A driving head-changeable tool 2 is also provided, including any kind of driving head-changeable tool sleeve assembly 1, 1a, 1b or 1c as described above. The driving head-changeable tool 2 further includes a driving head 40. The driving head 40 includes a polygonal ball head 41 and a radial flange 42 correspondingly above the polygonal ball head 41. The driving head 40 is detachably inserted in the receiving slot 11 of the connecting sleeve 10.

As a conclusion, the driving head is easily withdrawable and for replacing with others through sliding the outer sleeve and the connecting sleeve relative to each other. It is convenient and fast in operating. And a structure of the driving head-changeable tool and sleeve assembly thereof is simple and easy for manufacturing and assembling.

Moreover, an inner wall of the receiving slot is formed with a plurality of protruding ribs, and the protruding ribs have an arc surface (contacting surface) with larger radius of curvature so that the protruding ribs contact with the polygonal ball head through points (non-surface). And the protruding ribs are arranged equidistantly so that the polygonal ball head has enough space to swing. The driving head swings smoothly relative to the connecting sleeve. It solves a problem of prior art that a structure of prior art gets stuck when rotating with a high speed. And it also helps to improve a working efficiency and is convenient in operating for operators because a friction is reduced substantially.

Besides, an overlapping stepped portion structure can also be obtained on the outer sleeve or the radial flange of the driving head, and when the outer sleeve moves toward the second position, the driving head is withdrawable and for replacing with others.

While we have shown and described various embodiments in accordance with the present invention, it should be clear to those skilled in the art that further embodiments may be made without departing from the scope of the present invention.

What is claimed is:

1. A driving head-changeable tool sleeve assembly, comprising: a connecting sleeve, integrally formed of one piece, including a receiving slot and a driving end corresponding to each other, an inner wall of the receiving slot formed with a plurality of protruding ribs extending axially and a plurality of recesses disposed between the protruding ribs, in a radial cross-section, each of the protruding ribs formed with a protruding camber connected with two of the recesses, extensions of every two adjacent protruding cambers disintersected on the connecting sleeve; an outer sleeve, axially slidably telescoped around the connecting sleeve, the outer sleeve and the connecting sleeve mutually restricted, a recessed portion and a protruding portion protruded relative to the recessed portion disposed on an inner wall of the outer sleeve, the outer sleeve slidable between a first position and a second position relative to the connecting sleeve;

at least one limitation member, disposed on one of the protruding ribs and between the connecting sleeve and the outer sleeve, retractably protruded out of the receiving slot and retractable entirely within the protruding rib;

wherein when the outer sleeve is at the first position, the protruding portion abuts against the limitation member to protrude to within the receiving slot; when the outer sleeve is at the second position, the recessed portion corresponds to the limitation member so that the limitation member is allowed to move to within the recessed portion and the limitation member is retracted entirely within the protruding rib;

wherein the connecting sleeve includes six of the protruding ribs and six of the recesses which are circumferentially arranged equiangularly and alternatively, the protruding ribs linearly extend in parallel axially, the recesses linearly extend in parallel axially;

wherein in a radial cross-section view, a circumferential extent of the recess is greater than ¼ of a circumferential extent of the protruding rib.

2. The driving head-changeable tool sleeve assembly as claimed in claim 1, wherein the connecting sleeve is formed with a first circumferential chamfer along a rim of an opening of the receiving slot.

3. The driving head-changeable tool sleeve assembly as claimed in claim 1, wherein an end of the outer sleeve radially extends to form a positioning flange, in a radial direction, a sleeve opening defined by the positioning flange is greater than or equal to an opening of the receiving slot.

4. The driving head-changeable tool sleeve assembly as claimed in claim 3, wherein the outer sleeve is formed with a second circumferential chamfer along a rim of the sleeve opening of the positioning flange.

5. The driving head-changeable tool sleeve assembly as claimed in claim 4, wherein the connecting sleeve is formed with a first circumferential chamfer along a rim of an opening of the receiving slot, and the first and second circumferential chamfers are disposed in an inside-and-outside arrangement.

6. The driving head-changeable tool sleeve assembly as claimed in claim 3, wherein the positioning flange and the receiving slot form a stepped portion.

7. The driving head-changeable tool sleeve assembly as claimed in claim 3, wherein as viewed along an axial direction, at least a part of the positioning flange overlaps between the radial flange and the connecting sleeve.

8. The driving head-changeable tool sleeve assembly as claimed in claim 7, wherein a top surface of the positioning flange is concavely formed with a first stepped portion, and the first stepped portion is disposed along a rim of the sleeve opening of the positioning flange.

9. The driving head-changeable tool sleeve assembly as claimed in claim 1, wherein an elastic member is abutted against between the connecting sleeve and the outer sleeve.

10. The driving head-changeable tool sleeve assembly as claimed in claim 1, wherein a top surface of the connecting sleeve is concavely formed with a third stepped portion, the third stepped portion is disposed along an inner rim of an opening of the receiving slot.

11. A driving head-changeable tool, including a driving head-changeable tool sleeve assembly as described in claim 1, further including: a driving head, formed with a polygonal ball head and a radial flange correspondingly above the polygonal ball head, and detachably inserted in the receiving slot of the connecting sleeve;

wherein when the outer sleeve is at the first position, the limitation member blocks and restricts the polygonal ball head in the receiving slot; when the outer sleeve is at the second position, the polygonal ball head is withdrawable from the receiving slot;

wherein when the outer sleeve is at the first position and the radial flange is limited in the sleeve opening by the positioning flange, the driving head and the connecting sleeve are unrotatable relative to each other; when the outer sleeve is at the first position and the radial flange is located outside the sleeve opening, the driving head is swingable about the polygonal ball head relative to the connecting sleeve.

12. The driving head-changeable tool as claimed in claim 11, wherein a bottom surface of the radial flange is concavely formed with a second stepped portion, as viewed along an axial direction, at least a part of the second stepped portion overlaps the positioning flange.

\* \* \* \* \*